July 7, 1942.  J. H. KINCAID  2,288,626
PNEUMATIC TROUGH
Filed June 1, 1940
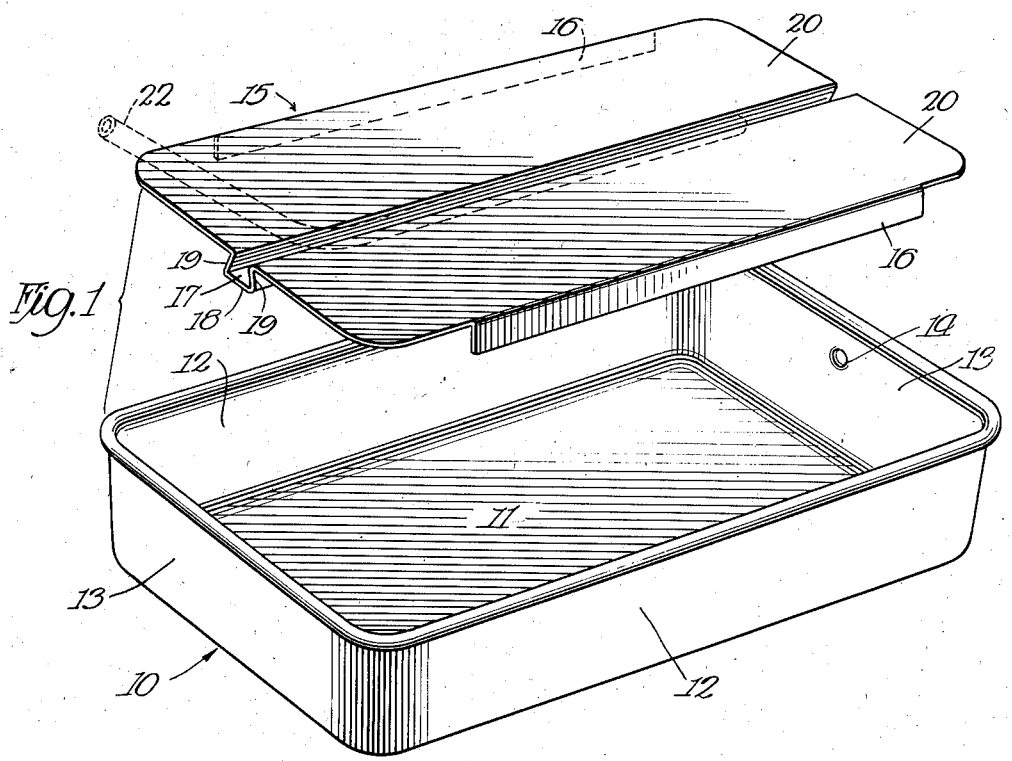
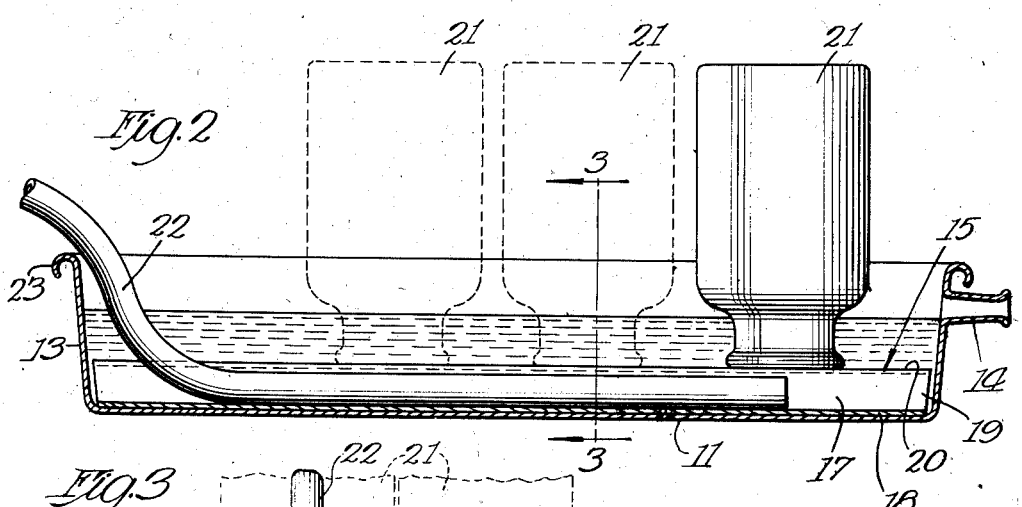
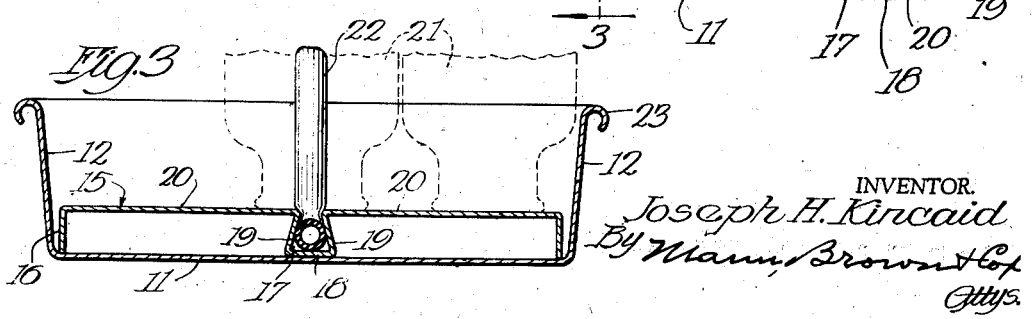
INVENTOR.
Joseph H. Kincaid
By Mann, Brown & Cox
Attys.

Patented July 7, 1942

2,288,626

UNITED STATES PATENT OFFICE 2,288,626

PNEUMATIC TROUGH

Joseph H. Kincaid, Evanston, Ill., assignor to Central Scientific Company, a corporation of Illinois Application June 1, 1940, Serial No. 338,391

6 Claims. (Cl. 226—20)

This invention relates to pneumatic troughs such as used in laboratories for collecting gases in inverted bottles over water and has for its principal objects to provide a support below the surface of the water in the trough for the necks of inverted bottles and an upwardly opening groove in this support to receive and retain a hose for the gas and to allow the hose to be adjusted along the groove to direct the delivery of the gas in a selected position or into a selected bottle.

The preferred embodiment of the invention is shown in the accompanying drawing, in which Fig. 1 is a perspective view of a pan forming the body of the trough and a separate platform displaced upwardly from the pan;

Fig. 2 is a longitudinal sectional view through the trough as it is arranged in use for the series of bottles supported on the platform and a hose extended down into the water and along the groove in the platform; and Fig. 3 is a transverse sectional view taken on the line 3—3 of Fig. 2.

But the specific drawing and the corresponding description are used for the purpose of disclosure only and are not intended to impose unnecessary limitations on the claims.

The pan or body, generally indicated by 10, includes a bottom 11, sides 12, and ends 13 preferably formed in one piece of enamel ware, but of course other materials may be used.

One end may or may not be provided with an over-flow pipe 14 according to choice but such a pipe is customarily a part of a pneumatic trough.

The platform generally indicated by 15 is composed of a sheet of enamel ware or other suitable material having side portions 16 turned downwardly to form support legs running along each side edge. About the middle, the sheet is preferably corrugated to form a groove substantially dovetail in shape as indicated at 17, the bottom 18 and sides 19 of which form intermediate legs extending throughout the length of the platform and giving direct support for those portions 20 which form the actual platform to support bottles 21.

The inclined walls 19 of the groove 17 have the effect of constricting the upper, open side of the groove to hold the hose 22 against the tendency to float out which results from being filled with gas so much lighter than water. The sides of the groove are such as to permit the hose to be readily inserted and adjusted along the groove, the upper, open side thereof being of less width than the diameter of the hose. However, this form is not imperative. A groove, somewhat narrower than the diameter, will serve in many cases, particularly if the walls are somewhat roughened. The point is that the groove should permit the hose to be inserted in the proper place where it will be retained during a suitable period of operation and can again be readily removed when that operation is finished.

The corners of the pan 10 between the sides and ends, and between them and the bottom, are preferably rounded and the rim is rolled over as indicated at 23 (Figs. 2 and 3).

Obviously the platform can be made as part of the bottom but it is preferably a separate piece with suitable legs for supporting it together with the weight of the bottles rested upon it.

I claim as my invention:

1. A pneumatic trough comprising a pan adapted to contain a liquid, and a platform in the pan below the level of the liquid long enough to support a plurality of aligned bottles and having an elongated upwardly opening groove extending beneath the plurality of bottles adapted to receive a gas-conducting hose extending in the groove parallel with the length thereof and having a gas-emitting opening, said groove being so constructed and arranged as to retain the hose at selected positions of the gas-emitting opening successively beneath each of the plurality of bottles.

2. A pneumatic trough comprising a pan adapted to contain a liquid, and a platform in the pan below the level of the liquid long enough to support a plurality of aligned bottles and having an elongated upwardly opening groove extending beneath the plurality of bottles adapted to receive a gas-conducting hose extending in the groove parallel with the length thereof and having a gas-emitting opening, said groove being so constructed and arranged as to retain the hose at selected positions of the gas-emitting opening successively beneath each of the plurality of bottles and said platform extending laterally beyond the groove to provide a surface on which bottles may be supported clear of the groove.

3. A pneumatic trough comprising a pan adapted to contain a liquid, and a platform in the pan below the level of the liquid long enough to support a plurality of aligned bottles and having an elongated upwardly opening groove extending beneath the plurality of bottles adapted to receive a gas-conducting hose extending in the groove parallel with the length thereof and having a gas-emitting opening, said groove being so constructed and arranged with respect to the hose that the hose will be retained against upward displacement from the groove but may be slid along the groove with the opening in the hose at selected positions successively beneath each of the plurality of bottles.

4. A pneumatic trough comprising an open top vessel for containing a liquid of a predetermined depth, a platform loosely supported on the bottom of said vessel within the same and extending upwardly adjacent to but below the surface of said liquid and long enough to support a plurality of aligned inverted gas receivers thereon and means for retaining a hose beneath said receivers whereby gas escaping from said hose may be collected in said receivers successively, said means comprising an elongated upwardly opening groove formed in the platform and so constructed and arranged as yieldably to grip the hose.

5. A platform for a pneumatic trough for supporting gas receivers comprising a strip of sheet metal having opposite edges turned downwardly to form supporting members and having its intermediate portion provided with a dovetail groove extending along said strip for containing a hose, the bottom wall of said groove being in the horizontal plane of the lower portions of the downwardly turned edges of said strip for assisting in supporting said containers.

6. A pneumatic trough comprising a pan adapted to contain a liquid and provided with a supporting portion below the level of the liquid long enough to support a plurality of aligned bottles and having an elongated upwardly opening groove extending beneath the plurality of bottles adapted to receive a gas-conducting hose extending in the groove parallel with the length thereof and having a gas-emitting opening, said groove being so constructed and arranged as to retain the hose at selected positions of the gas-emitting opening successively beneath each of the plurality of bottles.

JOSEPH H. KINCAID.